May 25, 1937.　　　　T. J. PARKER　　　　2,081,206
ELECTRIC STEAM BOILER
Filed May 2, 1936　　　　2 Sheets-Sheet 1

Inventor,
Thomas J. Parker.
By
Minturn Minturn,
Attorneys.

May 25, 1937. T. J. PARKER 2,081,206
ELECTRIC STEAM BOILER
Filed May 2, 1936 2 Sheets-Sheet 2

Inventor,
Thomas J. Parker
By
Minturn & Minturn,
Attorneys.

Patented May 25, 1937

2,081,206

UNITED STATES PATENT OFFICE 2,081,206

ELECTRIC STEAM BOILER

Thomas J. Parker, Indianapolis, Ind., assignor of three-fourths to Joe Waldner, Indianapolis, Ind.

Application May 2, 1936, Serial No. 77,505

4 Claims. (Cl. 219—38)

This invention relates to steam generators and particularly to a generator in which the source of heat is produced by electrical energy. A primary object of the invention is to generate steam rapidly within a small unit occupying a minimum of space and also utilizing a minimum of electrical energy. A further primary object of the invention is to provide a completely automatic unit which will maintain a constant steam pressure and a water level within fixed limits.

A further primary object of the invention is to provide one or more flues within which an electric heating element is positioned in a fixed predetermined manner so as to prevent contact of the heating element with the flue wall but at the same time permit that element to be carried in very close proximity to the wall. By providing a predetermined locating means, the element may thus be quickly assembled into the desired position with the required degree of accuracy.

A further important object of my invention is to provide a return connection on the heating element employed within the flue which will be recessed within the element carrier rather than be exposed on the interior so that a generally cylindrical shape may be maintained exteriorly of the element so as to permit the element to be carried in close proximity to the interior wall of the flue.

Figure 1:
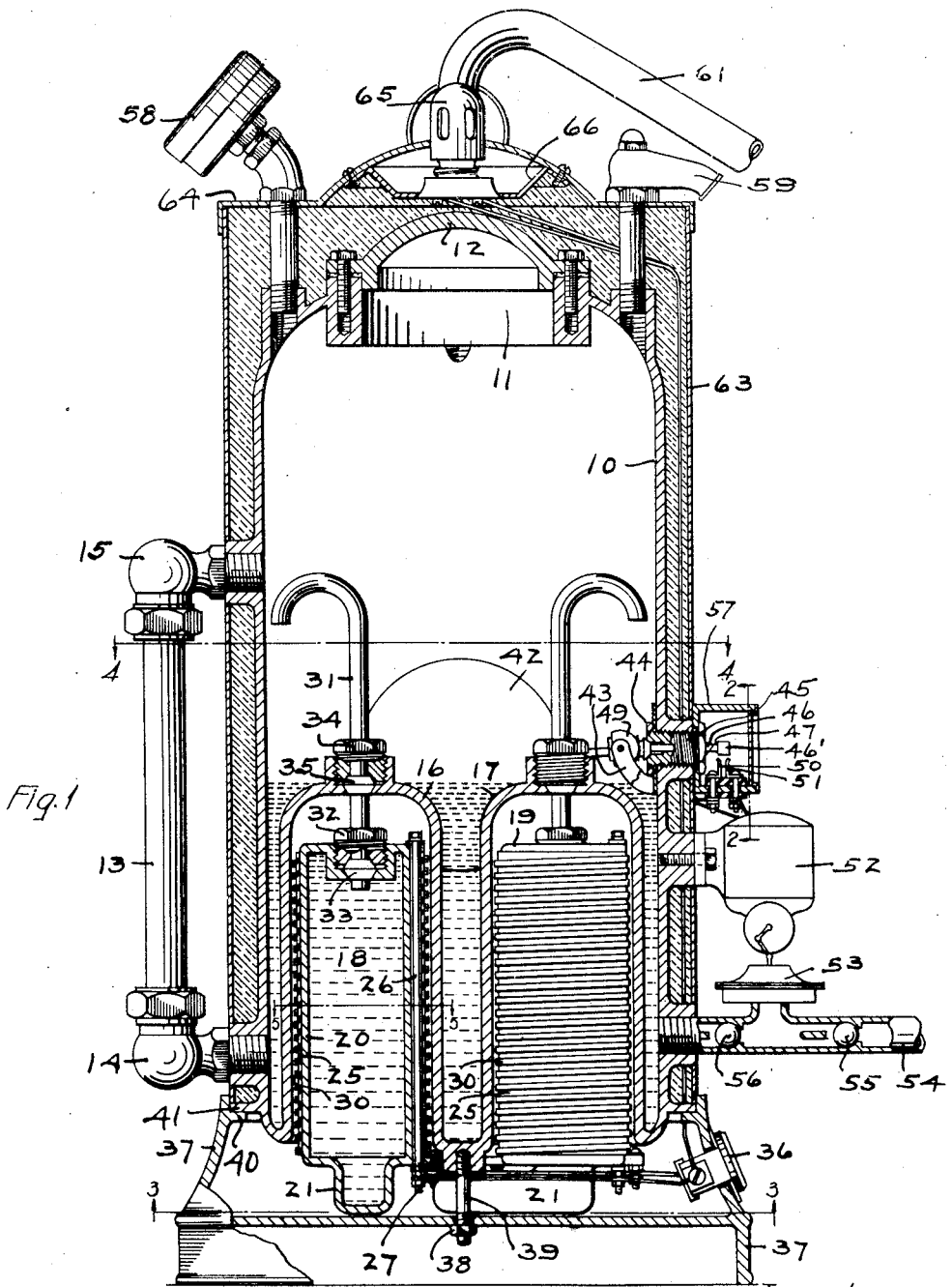
Figure 2:
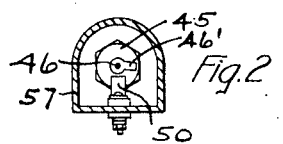
Figure 3:
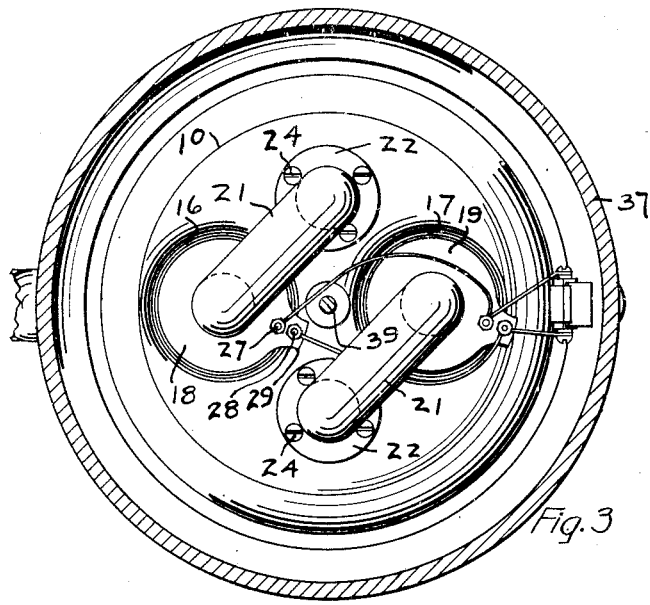
Figure 6:
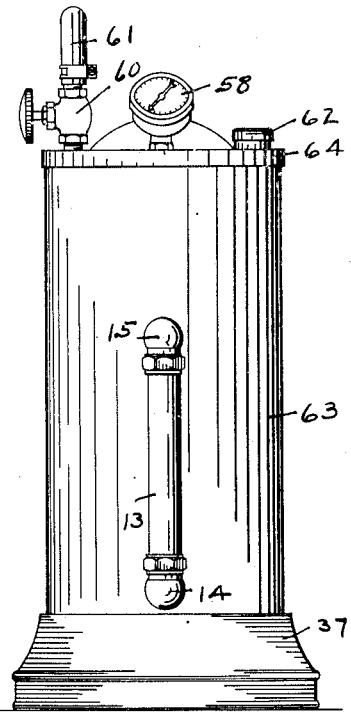
Figure 4:
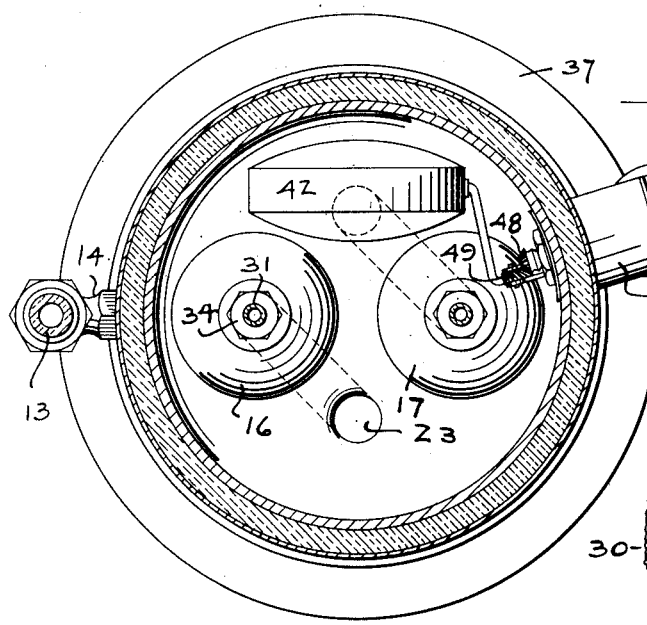
Figure 5:
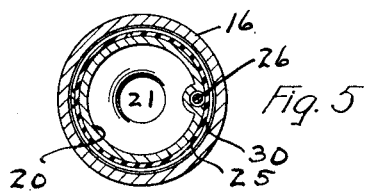

Further important objects and advantages of my invention such as the permissible use of a multiple number of flues and elements will become more apparent to those versed in the art in the following description of my invention as illustrated in one particular form in the accompanying drawings, in which Fig. 1 is a vertical transverse section through a structure embodying my invention;

Fig. 2, a detail in vertical section on the line 2—2 in Fig. 1;

Fig. 3, a horizontal section on the line 3—3 in Fig. 1;

Fig. 4, a horizontal section on the line 4—4 in Fig. 1;

Fig. 5, a horizontal section through one of the flues on the line 5—5 in Fig. 1;

Fig. 6, a side elevation of a generator on a reduced scale; and

Figure 7:
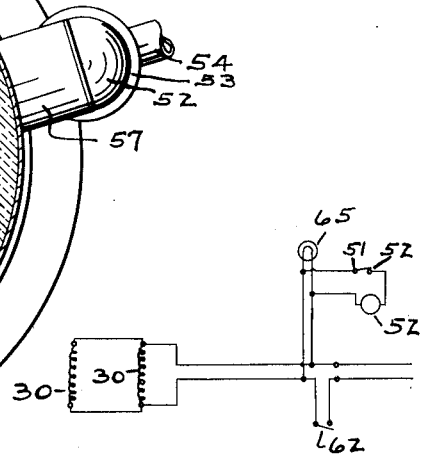

Fig. 7, a wiring diagram.

Like characters of reference indicate like parts throughout the several views in the drawings.

I provide a boiler 10 generally cylindrical in shape to have a top opening 11 normally covered by a cover plate 12. The hole 11 is made sufficiently large to permit the assembling of the necessary units therewithin as will be hereinafter described. On one side of the boiler is mounted a water glass 13 by the usual fittings 14 and 15 which carry the glass 13 in a vertically disposed position to have the fitting 14 near the base of the boiler 10.

The lower end of the boiler is formed to have re-entering portions which I term flues, here shown as two in number, designated by the numerals 16 and 17. These flues are cylindrical in shape and are formed inwardly preferably with the lower end of the boiler 10 to extend upwardly within the boiler in spaced relation one with the other and with the interior wall of the boiler as indicated in Figs. 1 and 4.

The flue 16 is provided with a heating element, generally designated by the numeral 18 positioned interiorly thereof. The flue 17 is provided with a similar element 19 which is an exact duplicate of the element 18 so that a detailed description of the element 18 will suffice to indicate the structure of the element 19 also. The element 18 is formed to have a water carrying cylinder 20 with a lower water passage or goose neck 21 extending horizontally therefrom and terminating with an upturned end around which extends an annular flange 22 formed to abut a milled or finished surface on the under side of the boiler 10 to provide communication from a hole 23 in the boiler into the goose neck 21. Attaching members such as the screws 24 properly locate the angularity of the goose neck on the under side of the boiler so as to position the water cylinder 20 centrally within the flue 16.

The exterior of the water cylinder 20 is wrapped with any suitable insulating material 25, such as mica, and then over this material is wrapped a wire or ribbon of suitable electrical resistance wire 30 to have the turns spaced one from the other as indicated in Fig. 1, the wrapping starting at the bottom and continuing around to terminate at the top of the cylinder to have the end of the resistance wire connected to a bolt or rod 26 which is positioned within a groove formed in the wall of the water cylinder 20 immediately back of the insulating material 25. This rod 26 extends along this groove in spaced relation from the metal wall of the cylinder and from end to end thereof to be insulated therefrom at its ends and to provide a lower terminal 27 protruding from the under side of the cylinder adjacent the terminal 28 which is carried on a tongue 29 extended from the base of the cylinder, the terminal 28 being connected with the lower end of the electrical winding 30. The diameter of the water cylinder 20 which forms the core of the heating element is made to be such that when the insulation 25 and the resistance wire 30 are applied therearound, the wire 30 will be in very close proximity to the inner side of the wall of the flue 16 but held out of electrical contact therewith.

Water carried in the boiler 10 may enter the cylinder 20 through the boiler opening 23 and thence around through the goose neck 21 into the cylinder. The upper end of the cylinder 20 is provided with a pipe or tube connection which discharges into the interior of the boiler 10. In forming this connection, the cylinder 20 is first positioned within the flue 16 carrying a length of copper or brass tubing 31 attached to the upper end of the cylinder in any suitable manner, here shown as being a nut 32 bearing against a compression sleeve 33 gripping the outside of the wall of the tube. The tube 31 extends upwardly vertically through an opening in the top end of the flue 16 and there again a water and steam tight joint is formed by a nut 34 forced down against a compression sleeve 35 fitting against the flue 16. After this connection is made, the upper end of the tube 31 is bent over to have its discharging end directed downwardly within the boiler 10. The same connection is duplicated between the heating element 19 and the flue 17.

The windings of the elements 18 and 19 are connected in parallel with a suitable socket 36 carried by a boiler supporting base 37 which surrounds the goose necks of the two elements and covers the lower end of the boiler 10. The base 37 is held in position by means of a nut 38 on a stud 39 extending from a boss centrally of the bottom of the boiler 10 so as to draw the base 37 upwardly to have an annular flange 40 thereof abut an annular flange 41 extending around the lower end of the boiler 10.

In order to provide an automatic maintenance of the water level within the boiler 10, I provide a float 42 swingably carried by a bracket 43 within the boiler, here shown as secured in position by a nut 44 engaged over the inner end of a plug 45 extending through a boss on the wall of the boiler 10. This plug 45 has a horizontal bore therethrough which carries a stem 46 having a bevel head on its inner end pressed against a corresponding seat by means of a spring 47 tending to pull the stem 46 outwardly. The stem 46 extends inwardly within the boiler 10 to carry a bevel gear 48 thereon which meshes with a gear segment 49 carried by the float stem so that up and down movement of the float 42 will cause the stem 46 to revolve about its axis. The valve head on the stem is provided to prevent leakage of steam or water outwardly through the plug 45 along the stem 46. The outer end of the stem 46 carries an arm 46', Fig. 2, which upon sufficient rotation will be carried between the upturned fingers 50 and 51, Fig. 1, to interconnect them through the arm and thereby close an electrical circuit in which a pump motor 52 is included. This motor 52 through suitable reduction means operates a diaphragm pump 53 which will take water in through a pipe 54 past the checks 55 and 56 to discharge the water within the boiler 10. The diaphragm pump 53 is not illustrated in detail since it may assume any one of the various forms now commercially obtainable upon the market. Thus it is to be seen that by rise and fall of the float 42, the motor may be set in operation and stopped depending upon the closing and opening of the circuit between the fingers 50 and 51. This mechanism for opening and closing the circuit is preferably carried within some suitable closure such as the box 57.

The upper end of the boiler 10 is provided with suitable bosses for connections with a steam gauge 58 and a safety valve 59 and also a steam outlet through the valve 60 and the pipe or hose 61. In order to provide an automatic control limiting the steam pressure generated, one of the customary pressure operated switches may be attached to the upper end of the boiler as indicated by the member 62, Fig. 6. The exact structure of this pressure controlled switch is immaterial to my invention and the details thereof are accordingly not indicated herein since such a switch may be obtained commercially in the various forms suitable for my purpose. The switch 62 is connected into the circuit as indicated in Fig. 7 so that when the switch is open, flow of current to the heating elements is interrupted, the switch being opened upon the steam pressure reaching the predetermined amount.

In order to conserve heat, and to prevent burning of those coming in contact with the device, I provide a jacket 63 which surrounds the boiler 10 in spaced relation and pack the intervening space with some insulating material such as mineral wool or the like. The jacket 63 is held in position by means of the various fittings extending therethrough from the boiler. A cover 64 fits over the top end of the jacket 63 and is held down by the fittings bearing thereagainst from above, such as the steam gauge 58 and the safety valve 59 and the like. Preferably a pilot lamp 65 is employed to indicate flow of current to the heating elements. In the form herein shown, the cover 64 is arched upwardly by its central portion to carry a lamp mounting plate 66 thereunder on which the lamp base is secured to have a lamp shield extending upwardly and through an opening in the cover, through windows in which shield the light of the lamp may be observed. This lamp 65 is connected into the general circuit as indicated by the diagram in Fig. 7.

In operation, when current is supplied to the heating elements the water within the water cylinders 20 will become quickly heated and as steam is generated therein, by reason of the reduced area of discharge opening in relation to the inlet opening of the cylinder, the steam thus generated together with the heated water will be forced out through the tube 31 into the boiler 10 in an intermittent manner so that for periods of time, the water within the cylinder 20 will not be disturbed and will thereby be permitted to become heated to a rather high degree by the electrical resistance wire 30 therearound. Of course while the water within the cylinder 20 is heating, heat from the resistance wire 30 is also being transmitted through the wall of the flue 16 to the water surrounding it within the boiler 10 so that the heat emitted and not being absorbed by the water within the cylinder 20 is not lost but thereby recovered. By reason of the winding being directly around the water cylinder 20 with but the thin sheet of insulating material intervening, and also by reason of the close proximity of the wire to the wall of the flue 16, the wire, being properly proportioned as to cross section and as to length, is not permitted to become heated to such a point as it will readily oxidize and thereby the life of the resistance wire is practically unlimited. In practice, the cross sectional area of the outlet opening in the bottom of the boiler to each water cylinder 20 is three times as great as that of the discharge tube 31.

As the steam is generated, the water level of course would drop and where the automatic supply is provided as above described, additional water will be brought in through the pipe 54 to maintain the desired level. Also when the steam reaches the predetermined desired pressure within the boiler 10, the circuit leading to the resistance wires 30 will be opened and thereby prevent further generation of steam until the pressure drops sufficiently to close the switch 62 and thereby again start steam generation.

By reason of the compact area of the heating elements and their relationship to the wall of the flues, I am able to provide more than one flue within the boiler 10 as compared to the structure shown and described in my previous Patent No. 1,995,814, issued March 26, 1935, without having to enlarge to any appreciable amount the size of the boiler 10. Therefore by changing the structure of the electric heating element, and reducing the diameter of the flue carrying the element, I am able to incorporate a plurality of such units within the boiler to provide for a greater steam generating capacity within the same size boiler and also am able to reduce the current required by reason of the greater efficiency obtained.

While I have herein shown and described my invention in the form as now best known to me, it is obvious that structural variations may be incorporated without departing from the spirit of the invention and I, therefore, do not desire to be limited to that precise form beyond the limitations as may be imposed by the following claims.

I claim:

1. In a steam generator, a boiler, and means distributed within the boiler for applying heat thereto comprising a plurality of spaced apart reentrant flues extending from the floor vertically within the boiler and terminating by upper closed ends therein, and an electrical heating element in each flue, said element comprising a cylindrical core interconnected by its lower end by a water passageway with the floor of the boiler, a winding of resistance wire about the outside of the core separated therefrom by a layer of insulation, said core discharging by its upper end through said flue closed end into the boiler, and said core being proportioned to carry said wire as closely as possible to the inner side of the wall of its flue without making electrical contact therewith, whereby the flue wall may absorb sufficient heat from said winding as to prevent its being heated to an oxidizing temperature, and means integral with the core and connecting with the boiler locating and maintaining said core centrally within its flue.

2. In an intermittently unloading steam generator, a heating unit comprising a vertically disposed flue having an upper closed end, the flue being inserted into the water of the generator from the floor thereof; a water carrying cylinder extending into the flue; an insulating member around the cylinder; an electrical resistance winding around the insulating member; said cylinder being of the diameter to carry said winding into close proximity to the wall of said flue; said cylinder being formed to have a groove behind said insulating member; a rod extending through said groove and interconnected with said winding at its upper end, and a terminal at its lower end; said cylinder having a discharge pipe leading from its top end through said flue closed end and having a bottom intake opening exceeding that of said pipe.

3. In a steam generator, a boiler; a cylindrical flue extending vertically into the boiler from its base and closed at its top end; a water cylinder; a cylindrical core in the water cylinder; a water conducting goose-neck integrally extending from the underside of the water cylinder under said boiler to carry water therefrom; means for locating the angularity of the goose-neck on the boiler to position the cylinder centrally in said flue; an electrical resistance winding about the outside of said core as close to the water cylinder as possible without making electrical contact therewith; an insulating wrapping between the cylinder and the winding; and a pipe extending from the top of said cylinder through said flue top into said boiler.

4. In a steam generator, a boiler; a cylindrical flue extending vertically into the boiler from its base and closed at its top end; a water cylinder; a cylindrical core in the water cylinder; a water conducting goose-neck integrally extending from the underside of the water cylinder under said boiler to carry water therefrom; means for locating the angularity of the goose-neck on the boiler to position the cylinder centrally in said flue; an electrical resistance winding about the outside of said core as close to the water cylinder as possible without making electrical contact therewith; an insulating wrapping between the cylinder and the winding; and a pipe extending from the top of said cylinder through said flue top into said boiler; said pipe being secured to said cylinder and initially inserted in a straight condition through said flue end; a compression fitting carried by said end engaging about said pipe to afford a gas tight connection between it and said end, said pipe having its upper end turned downwardly, the bending thereof being performed after said connection is completed.

THOMAS J. PARKER.